United States Patent
Maeng

(10) Patent No.: US 10,943,220 B1
(45) Date of Patent: Mar. 9, 2021

(54) AUTOMATICALLY PROCESSING SPLIT PAYMENTS IN POS DEVICE

(71) Applicant: Wells Fargo Bank, N.A., Charlotte, NC (US)

(72) Inventor: Joon Maeng, Newcastle, WA (US)

(73) Assignee: Wells Fargo Bank, N.A., San Francisco, CA (US)

(*) Notice: Subject to any disclaimer, the term of this patent is extended or adjusted under 35 U.S.C. 154(b) by 527 days.

(21) Appl. No.: 15/141,020

(22) Filed: Apr. 28, 2016

(51) Int. Cl.
*G06Q 20/20* (2012.01)
*G06Q 20/36* (2012.01)
*G06Q 20/32* (2012.01)
*G06Q 20/10* (2012.01)

(52) U.S. Cl.
CPC .......... *G06Q 20/204* (2013.01); *G06Q 20/10* (2013.01); *G06Q 20/3278* (2013.01); *G06Q 20/36* (2013.01)

(58) Field of Classification Search
CPC .. G06Q 20/204; G06Q 20/10; G06Q 20/3278; G06Q 20/36
See application file for complete search history.

(56) References Cited

U.S. PATENT DOCUMENTS

| | | | | |
|---|---|---|---|---|
| 8,224,700 B2* | 7/2012 | Silver | ................... | G06Q 20/102 705/15 |
| 8,498,900 B1* | 7/2013 | Spirin | ..................... | G06Q 20/14 705/15 |
| 8,509,744 B2* | 8/2013 | Brennan | .................. | H04W 4/60 455/412.2 |
| 8,548,908 B2* | 10/2013 | Friedman | ............. | G06Q 20/363 705/41 |
| 8,655,762 B2* | 2/2014 | Abifaker | ................ | G06Q 40/00 705/35 |
| 8,751,317 B2* | 6/2014 | Qawami | ................. | G06F 21/31 705/21 |

(Continued)

FOREIGN PATENT DOCUMENTS

| | | |
|---|---|---|
| EP | 2113895 | 11/2009 |
| WO | 2015023713 | 2/2015 |

OTHER PUBLICATIONS

Square, Inc. "Send Invoices Online With Square", accessed Mar. 14, 2016, 2 pages. Retrieved from the Internet at: https://squareup.com/help/us/en/article/5137-send-invoices-online-with-square.

(Continued)

*Primary Examiner* — Peter Ludwig
*Assistant Examiner* — Michael Jared Walker
(74) *Attorney, Agent, or Firm* — Walter Haverfield LLP; James J. Pingor

(57) ABSTRACT

Systems and methods that facilitate a mobile wallet splitting payments to an invoice between multiple payment accounts are disclosed herein. The mobile wallet can receive an invoice, and then select a set of payment accounts to each pay a portion of the invoice. The mobile wallet can send the payment information to a point of sale device, indicating that the payment include multiple payments from different payment accounts. The point of sale device can then process the multiple payments, either sequentially, or in parallel. In an embodiment, the mobile wallet can receive partial payments from other mobile wallets for the invoice, collect the payments together, and send the payment information at once to the point of sale device for the set of mobile wallets.

13 Claims, 10 Drawing Sheets

(56) References Cited

U.S. PATENT DOCUMENTS

| | | | | |
|---|---|---|---|---|
| 8,751,387 | B2* | 6/2014 | Hougland | G06Q 20/227 705/40 |
| 8,897,810 | B2* | 11/2014 | Brennan | H04W 4/00 455/456.3 |
| 9,129,273 | B2* | 9/2015 | Baldwin | G06Q 20/204 |
| 9,317,846 | B2* | 4/2016 | Baldwin | G06Q 20/3278 |
| 2005/0261969 | A1* | 11/2005 | Dimmock | G06F 13/102 705/16 |
| 2009/0112766 | A1* | 4/2009 | Hammad | G06Q 20/3574 705/44 |
| 2012/0239417 | A1* | 9/2012 | Pourfallah | G06Q 30/0601 705/2 |
| 2013/0124412 | A1* | 5/2013 | Itwaru | G06Q 20/20 705/44 |
| 2013/0159173 | A1* | 6/2013 | Sivaraman | G06Q 20/322 705/39 |
| 2013/0332354 | A1* | 12/2013 | Rhee | G06Q 20/3674 705/41 |
| 2013/0339253 | A1* | 12/2013 | Sincai | G06Q 20/3276 705/71 |
| 2014/0100931 | A1* | 4/2014 | Sanchez | G06Q 20/3278 705/14.23 |
| 2014/0156508 | A1* | 6/2014 | Argue | G06Q 20/32 705/39 |
| 2014/0156517 | A1* | 6/2014 | Argue | G06Q 20/209 705/40 |
| 2014/0164234 | A1* | 6/2014 | Coffman | G06Q 20/102 705/40 |
| 2014/0180929 | A1* | 6/2014 | Ohnishi | G06Q 20/102 705/64 |
| 2014/0279098 | A1* | 9/2014 | Ham | G06Q 20/102 705/16 |
| 2014/0351072 | A1* | 11/2014 | Wieler | G06Q 20/405 705/21 |
| 2014/0351118 | A1* | 11/2014 | Zhao | G06Q 20/227 705/40 |
| 2014/0351130 | A1* | 11/2014 | Cheek | G06Q 20/29 705/44 |
| 2015/0012426 | A1* | 1/2015 | Purves | G06Q 20/386 705/41 |
| 2015/0073952 | A1* | 3/2015 | Ventura | G06Q 40/12 705/30 |
| 2015/0120345 | A1* | 4/2015 | Rose | G06Q 30/0631 705/5 |
| 2015/0186871 | A1* | 7/2015 | Laracey | G06Q 20/3278 705/41 |
| 2015/0227922 | A1* | 8/2015 | Filler | G06Q 20/382 705/41 |
| 2015/0254649 | A1* | 9/2015 | Radu | G06Q 20/202 705/16 |
| 2016/0042328 | A1* | 2/2016 | Teckchandani | G06Q 20/102 705/44 |
| 2016/0117651 | A1* | 4/2016 | Davis | G06Q 20/386 705/40 |

OTHER PUBLICATIONS

Square, Inc. "Process Split Tender With Square Register", accessed Mar. 14, 2016, 2 pages. Retrieved from the Internet at: https://squareup.com/help/ca/en/article/5097-process-split-tender-with-square-register.

Matt Niehaus. "How mobile point of sale can speed up service", Instore blog, Jan. 9, 2015, 2 pages. Retrieved from the Internet at: http://instoredoes.com/how-mobile-point-of-sale-can-speed-up-service/.

R. Nagasubramanian, et al. "Online Payment—Innovation in Split Tender Payment", International Journal of Computer Applications, vol. 55, No. 10, Oct. 2012, pp. 35-41.

* cited by examiner

AUTOMATICALLY PROCESSING SPLIT
PAYMENTS IN POS DEVICE

BACKGROUND

From time to time, a person may be presented with an invoice for an amount of money that is higher than any single payment account that the person may have. For instance, if the invoice is for $10,000, but the person only has credit cards with $5000 credit limits, that person will not be able complete the transaction, even if the combined credit limits are sufficient to pay the invoice. Similarly, a group of people may ask a merchant to process a split payment. Merchants may have to manually divide a bill into multiple payments and process them one at a time to complete the transaction. However, point of sale devices at large retailers often do not accept split payments due to inefficient manual process. If buyers want to use multiple payment types for purchasing a product/service, they may have to work with a store manager to process split payments.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate a mobile wallet splitting payments to an invoice between multiple payment accounts. The mobile wallet can receive an invoice, and then select a set of payment accounts to each pay a portion of the invoice. The mobile wallet can send the payment information to a point of sale device, indicating that the payment include multiple payments from different payment accounts. The point of sale device can then process the multiple payments, either sequentially, or in parallel. In an embodiment, the mobile wallet can receive partial payments from other mobile wallets for the invoice, collect the payments together, and send the payment information at once to the point of sale device for the set of mobile wallets.

For these considerations, as well as other considerations, in one or more embodiments, a mobile wallet system can include a memory to store computer-executable instructions and a processor, coupled to the memory, to facilitate execution of the computer-executable instructions to perform operations. The operations can include receiving an invoice for a payment amount for a transaction via an electromagnetic wireless communication from a point of sale device. The operations can also include selecting a plurality of payment accounts to pay the invoice, wherein each payment account of the plurality of payment accounts pays a portion of the payment amount. The operations can also include generating payment information representing the plurality of payment accounts and payment amounts for each payment account and transmitting the payment information to the point of sale device via another electromagnetic wireless communication.

In another embodiment, a method for receiving, by a mobile device comprising a processor, an invoice for a transaction from a point of sale device, wherein the mobile device receives the invoice via an electromagnetic wireless communication. The method can also include determining a plurality of payment accounts to respectively pay portions of the invoice. The method can also include determining payment information for each of the plurality of payment accounts, wherein the payment information comprises an amount of money that each payment account of the plurality of payment accounts is paying towards the invoice. The method can also include transmitting the payment information to the point of sale device via another electromagnetic wireless communication, wherein the payment information comprises a notification that an invoice payment has been split between the plurality of payment accounts.

In another embodiment, a point of sale device comprises a memory to store computer-executable instructions and a processor, coupled to the memory, to facilitate execution of the computer-executable instructions to perform operations including in response to sending an invoice to a mobile device via an electromagnetic wireless communication, receiving payment information from the mobile device via another electromagnetic wireless communication. The operations can also include determining that the payment information comprises payment information from a plurality of payment accounts, wherein the payment information from the plurality of payment accounts correspond to a payment amount of the invoice. The operations can also include submitting the payment information from the plurality of payment accounts to a server associated with a plurality of financial institutions associated with the plurality of payment accounts.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
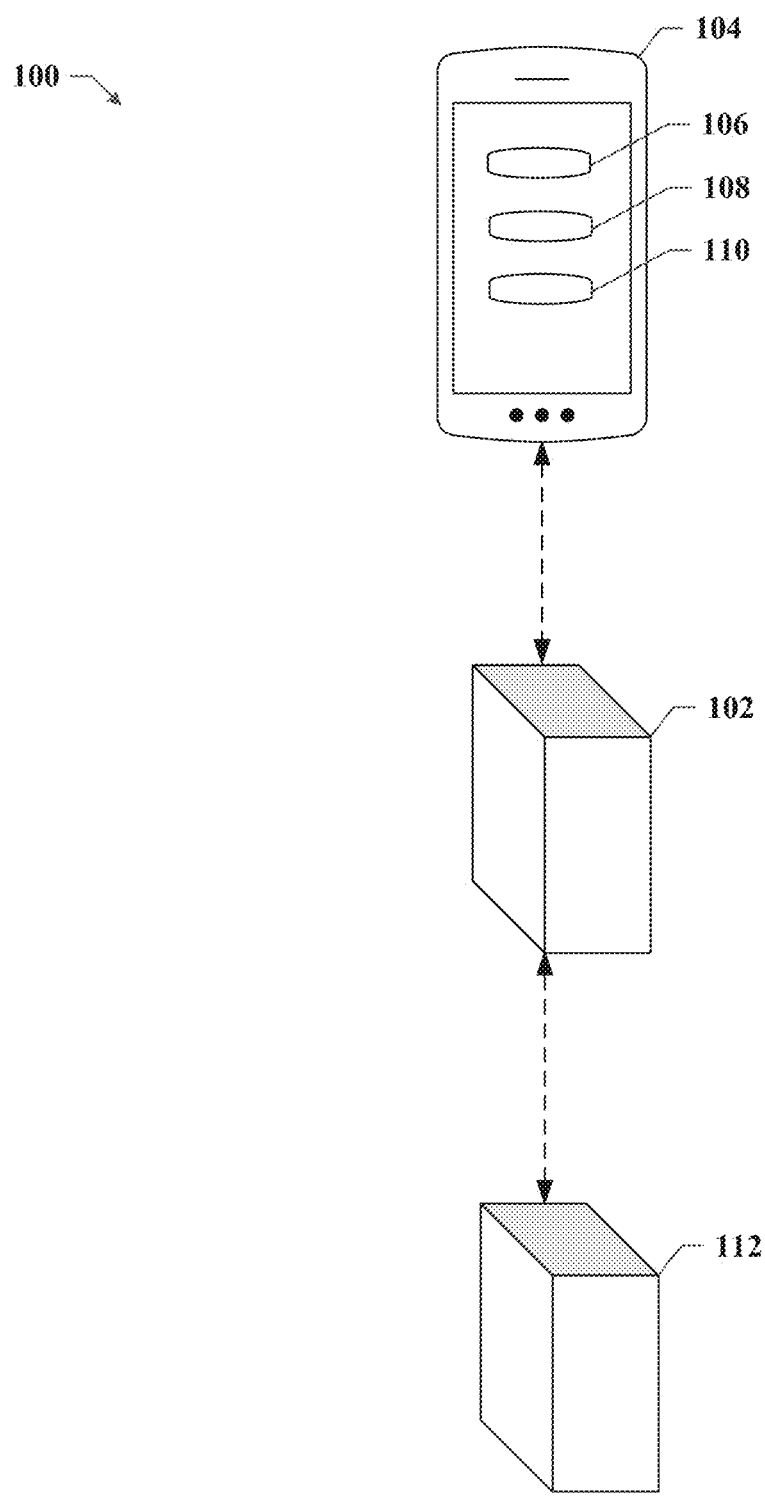
FIG. 1 is an illustration of an example system for making mobile payments using a plurality of mobile accounts in accordance with one or more aspects of the disclosure.

The following terms are used throughout the description, the definitions of which are provided herein to assist in understanding various aspects of the disclosure.

As used in this disclosure, the term "device" or "client device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

In an embodiment, a point of sale device indicates that it can process split payments to mobile wallets and process them automatically over a Near Field Communication (NFC). The point of sale device can receive a first payment with a first account and get an authorization from the first account issuer. The point of sale device can also receive a second payment with a second account, which is different from the first account, and get an authorization from the second account issuer. When the total amount in the invoice is equal to the sum of split payments authorized by each issuer, the point of sale device completes the transaction of processing multiple payments for a single transaction and transmits a receipt to the mobile wallet. In other embodiments, the point of sale device may accept split payments submitted by multiple mobile wallets for a single transaction.

FIG. 1 illustrates an example system 100 for making mobile payments using a plurality of mobile accounts in accordance with one or more aspects of the disclosure. The system 100 can include a point of sale device 102 and a mobile device 104 that has several payment accounts 106, 108, and 110 associated with the mobile device 104. The point of sale device 102 can issue an invoice to mobile device 104 and mobile device 104 can pay the invoice using two or more of payment accounts 106, 108, and 110.

Payment accounts 106, 108, and 110 can be associated with a mobile wallet associated with or installed on mobile device 104. The mobile wallet can include payment account information such as bank account, credit card number, routing numbers, and other authentication information for the payment accounts 106, 108, and 110. The mobile wallet can also include balance information, rewards information, and other information that can be used to make payments and transfers, receive transfers, and receive invoices. The point of sale device 102 can be any device that can issue invoices or receive payments. Non-limiting examples of point of sale devices that point of sale device 102 can be in various embodiments can be restaurant payment machines, handheld credit card scanners, grocery scanning machines, gas station payment devices, etc.

Point of sale device 102 can be configured to receive credit card/debit card payments as well as payments received from mobile devices (e.g., mobile device 104) via mobile wallets. The mobile wallet on mobile device 104 can be an application that stores credit card, bank card, peer to peer payment account, and bank account information related to payment accounts 106, 108, and 110 to facilitate making electronic payments. The mobile wallet can also keep track of invoices/receipts, payments, balances, and other transactions. In an embodiment, the mobile wallet on mobile device 104 can transfer payment information to the point of sale device 102 via wireless communications. In an embodiment, the wireless communications can include WiFi, Bluetooth, cellular protocols, infrared transmission, WiMax, Zigbee, RFID protocols, or any other near field communication (NFC) protocols. In an embodiment, the mobile device 104 can transmit the payment information to point of sale device 102 via an optical communication, either via laser, pulsing lights or by providing a barcode or quick response (QR) code that can be scanned by the point of sale device 102.

In an embodiment, point of sale device 102 can issue an invoice or request for payment to mobile device 104. The invoice can be transmitted to mobile device 104 via one or more of the wireless communications protocols described above. The mobile device 104 can receive the invoice, and a user can determine which of accounts 106, 108, and 110 will be used to pay the invoice. In some embodiments, the accounts can be selected automatically based on a predetermined selection logic.

In an embodiment, a plurality of payment accounts 106, 108, and 110 can be selected to pay the invoice, with each payment account paying a portion of the invoice. For instance, if the invoice is $100, payment account 106 can pay $30, payment account 108 can pay $30, and payment account 110 can pay $40. The payment information (account numbers, authorization information, payment amount, etc.) can then be sent by the mobile device 104 to point of sale device 102 via one or more of the wireless communications protocols described above. Point of sale device 102 can then send the payment information to a payment server 112 associated with one or more of the payment accounts 106, 108, or 110 for processing. Payment server 112 can indicate to point of sale device 102 that the payments were successful, and provide a receipt, either paper or electronic, to the user or mobile device 104.

In an embodiment, point of sale device 102, when sending the invoice to mobile device 104, can include a notification or alert that indicates that the point of sale device 102 can accept split payments. The notification can be included in the metadata of the invoice or transmission or can be an option selected on the invoice. Similarly, in one or more embodiments, the mobile device 104 when returning the payment information to the point of sale device 102, can include a notification or alert to let the point of sale device 102 know that the payment is a split payment. In other embodiments, the point of sale device 102 can initiate a processing fee for split payments since processing multiple payment authorizations through the payment network may cost additional fees to the merchant. The point of sale device 102 can ask if the mobile wallet owner is willing to pay the additional fee to make a split payment.

It is to be appreciated that while FIG. 1 displays mobile device 104 having three payment accounts, in other embodiments, mobile device 104 can have a mobile wallet that has two or more payment accounts configured to make payments to the invoice.

Figure 2:
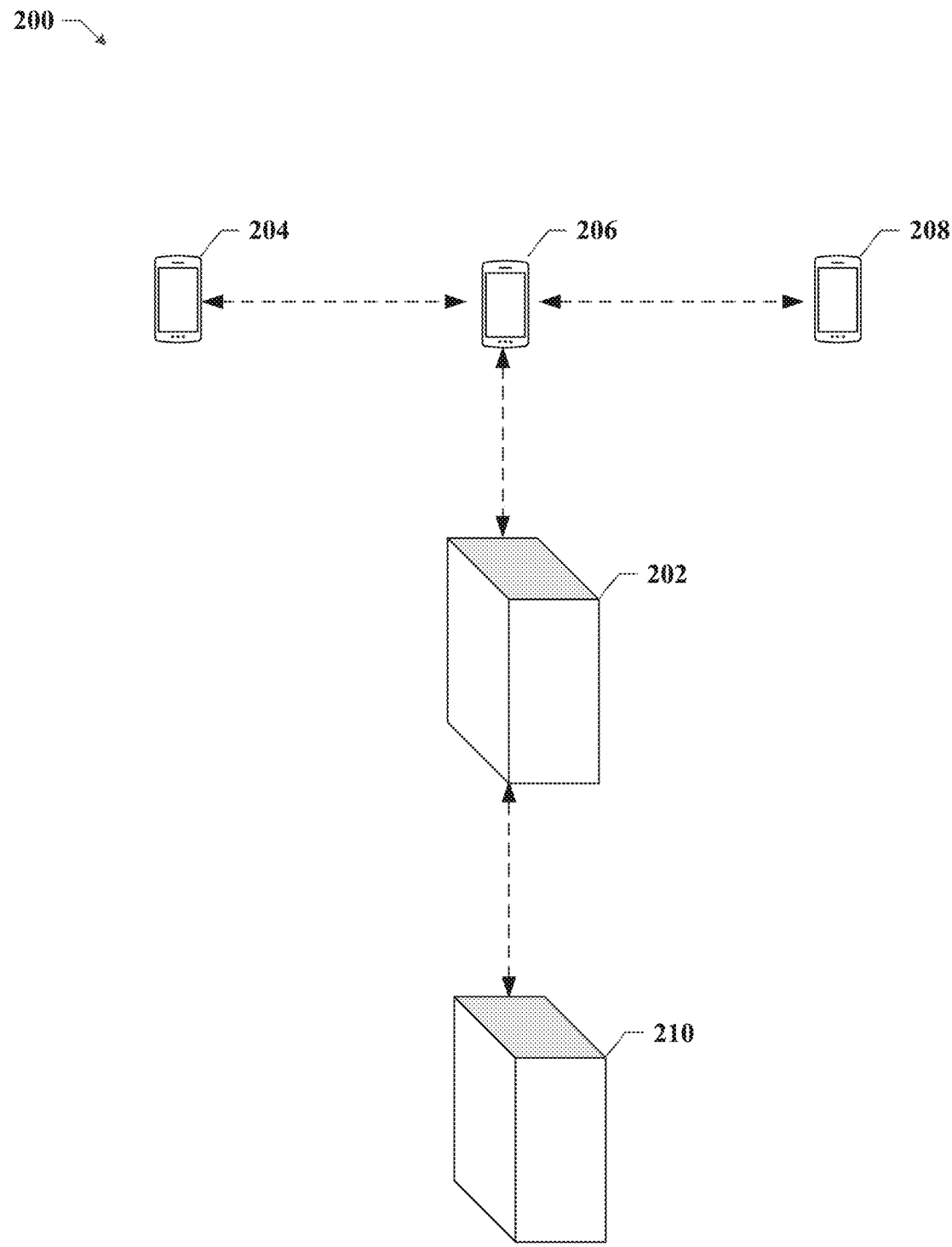
FIG. 2 is an illustration of an example system for making partial mobile payments from multiple device in accordance with one or more aspects of the disclosure.

Turning now to FIG. 2, illustrated is an example system 200 for making partial mobile payments from multiple device in accordance with one or more aspects of the disclosure. The system 200 can include a point of sale device 202 and mobile devices 204, 206, and 208 that can makes combined payments to point of sale device 202. The point of sale device 202 can issue an invoice to one or more of the mobile devices 204, 206, and/or 208 (in this embodiment, mobile device 206) and two or more mobile wallets associated with mobile devices 204, 206, and 208 can make the payments in response to the invoice.

In an embodiment, if point of sale device 202 issues the invoice to mobile device 206, mobile device 206 can share the invoice with mobile devices 204 and 208. Each of the mobile devices 204 and 208 can send payment information to mobile device 206 which can combine the payment information with the payment information from mobile device 206 and then transmit the combined payment information to point of sale device 202. In other embodiments, after sharing the invoice with mobile devices 204 and 206, each of mobile devices 204, 206, and 208 can separately send the payment information to point of sale device 202.

In an embodiment, the mobile wallets on mobile devices 204, 206, and 208 can automatically apportion the split payments based on information in the invoice or based on other, predetermined factors. The invoice can reference items on the bill that are associated with one or more of the users of mobile devices 204, 206, and 208, and each mobile wallet can match the items to the users, and apportion their payments accordingly. In other embodiments, the users can decide amongst themselves how to split the payments, enter the payment amount into their respective mobile devices, and the invoice payment can be apportioned based on the payment information received from each mobile device. In other embodiments, the invoice payment can be split equally or some other predetermined ratio.

In other embodiments, other combinations of payments accounts are possible. For instance, mobile device 206 may have two payment accounts that contribute to the invoice payment, and either mobile device 204 or 208 may have one or more payment accounts also contributing to the invoice payment. It is to be appreciated that while combinations from three mobile devices are shown here, in other embodiments, different numbers of mobile devices contributing payment information are possible.

The mobile wallets on each of mobile devices 204, 206, and 208 can include payment account information such as bank account, credit card number, routing numbers, and other authentication information for the payment accounts associated with each mobile device 204, 206, and 208. The mobile wallet can also include balance information, rewards information, and other information that can be used to make payments and transfers, receive transfers, and receive invoices. The point of sale device 202 can be any device that can issue invoices or receive payments. Non-limiting examples of point of sale devices that point of sale device 202 can be in various embodiments can be restaurant payment machines, handheld credit card scanners, grocery scanning machines, gas station payment devices, etc.

Point of sale device 202 can be configured to receive credit card/debit card payments as well as payments received from mobile devices 204, 206, and/or 208 via mobile wallets. The mobile wallets on mobile devices 204, 206, and/or 208 can be an application that stores credit card, bank card, peer to peer payment account, and bank account information related to payment accounts to facilitate making electronic payments. The mobile wallets can also keep track of invoices/receipts, payments, balances, and other transactions. In an embodiment, the mobile wallets on mobile device 204, 206, and/or 208 can transfer payment information to the point of sale device 202 via wireless communications. In an embodiment, the wireless communications can include WiFi, Bluetooth, cellular protocols, infrared transmission, WiMax, Zigbee, RFID protocols, or any other near field communication (NFC) protocols. In an embodiment, the mobile devices 204, 206, and/or 208 can transmit the payment information to point of sale device 202 via an optical communication, either via laser, pulsing lights or by providing a barcode or quick response (QR) code that can be scanned by the point of sale device 202.

In an embodiment, point of sale device 202 can issue an invoice or request for payment to mobile devices 204, 206, and/or 208. The invoice can be transmitted to mobile devices 204, 206, and/or 208 via one or more of the wireless communications protocols described above. The mobile devices 204, 206, and/or 208 can receive the invoice, and a user can determine which of accounts will be used to pay the invoice. In some embodiments, the accounts can be selected automatically based on a predetermined selection logic.

In an embodiment, the payment information (account numbers, authorization information, payment amount, etc.) can then be sent by the mobile devices 204, 206, and/or 208 to point of sale device 202 via one or more of the wireless communications protocols described above. Point of sale device 202 can then send the payment information to a payment server 210 associated with one or more of the payment accounts on mobile devices 204, 206, and/or 208 for processing. Payment server 210 can indicate to point of sale device 202 that the payments were successful, and provide a receipt, either paper or electronic, to the user or mobile devices 204, 206, and/or 208 or to the users associated with the mobile devices 204, 206, and/or 208.

In an embodiment, point of sale device 202, when sending the invoice to mobile devices 204, 206, and/or 208, can include a notification or alert that indicates that the point of sale device 202 can accept split payments. The notification can be included in the metadata of the invoice or transmission or can be an option selected on the invoice. Similarly, in one or more embodiments, the mobile devices 204, 206, and/or 208 when returning the payment information to the point of sale device 202, can include a notification or alert to let the point of sale device 202 know that the payment is a split payment.

Figure 3:
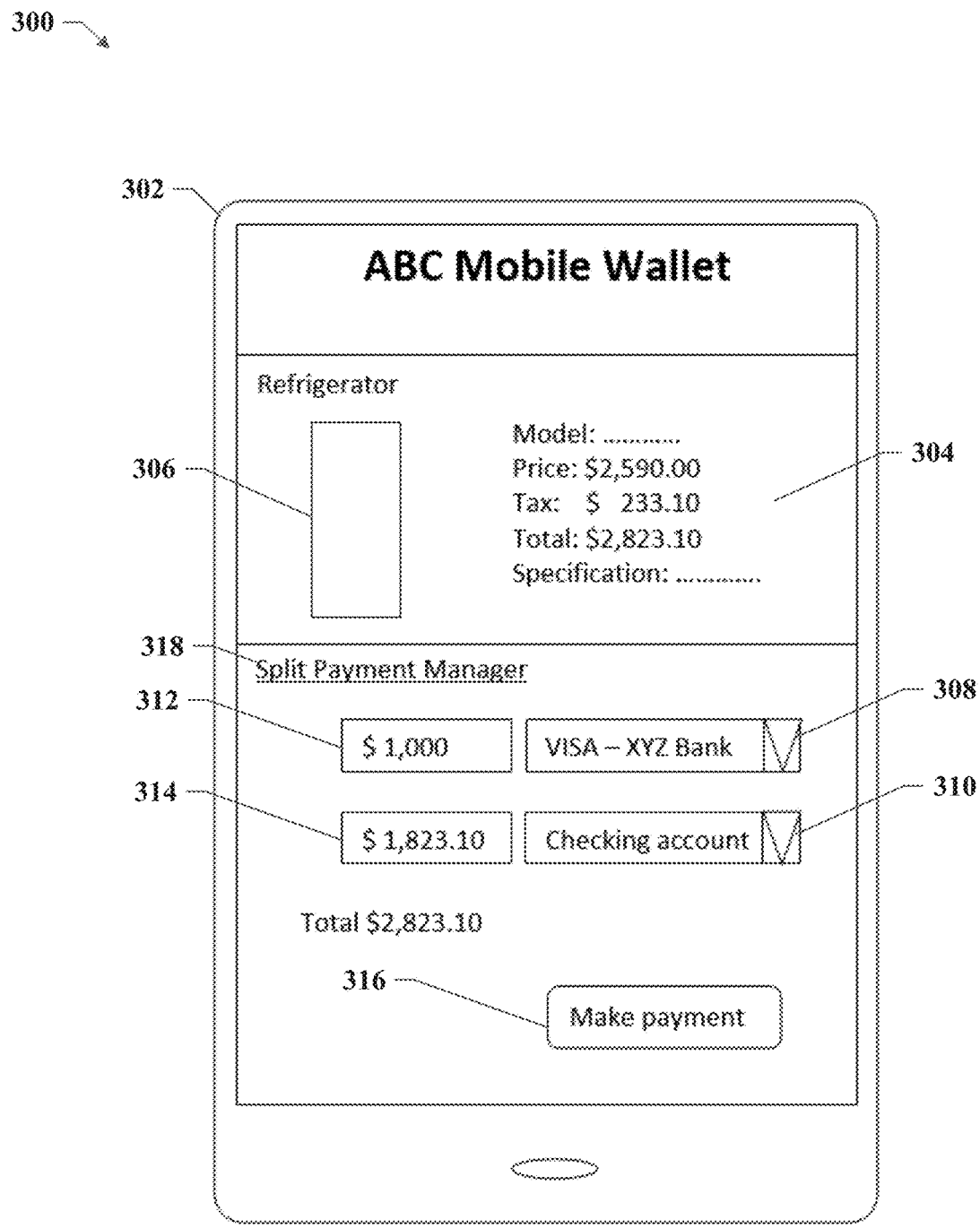
FIG. 3 is an illustration of an example mobile wallet application interface for making partial mobile payments from a plurality of payment accounts in accordance with one or more aspects of the disclosure.

Turning now to FIG. 3, illustrated is an example mobile wallet application interface 300 for making partial mobile payments from a plurality of payment accounts in accordance with one or more aspects of the disclosure The mobile wallet 302 executed by a mobile device can receive an invoice 304 with product description 306 and the total amount (i.e., $2,823.10). The mobile wallet 302 can also include a split payment manager 318 where the user can make the payment with multiple mobile wallet accounts 308 and 310. The user can specify payment amounts 312 and 314 that correspond to payment accounts 308 and 310 respectively.

In an embodiment, the user can specify that payment account 308 will contribute $1,000 towards the invoice and selects Visa-XYZ Bank 308 first. If the total amount is larger than the selected payment amount, the mobile wallet 302 can automatically open a window to specify amount and payment account. For instance, the mobile wallet 302 can let the user specify $1,590 and select a checking account 310. If the total amount is equal to sum of split payment, it may stop presenting a window to specify another account. The user can touch the make payment button 316 to submit the payment to a POS device. The mobile wallet 302 can put a notification in the transmission that the payment information is from two or more different payment accounts In one embodiment, the mobile wallet may present split payment manager if the total purchase price is higher than balance of any payment account of in the mobile wallet. In other embodiment, the user may have configured to make split payment if the total exceed a predetermined amount even if the total is lower than a balance of one payment account.

Figure 4:
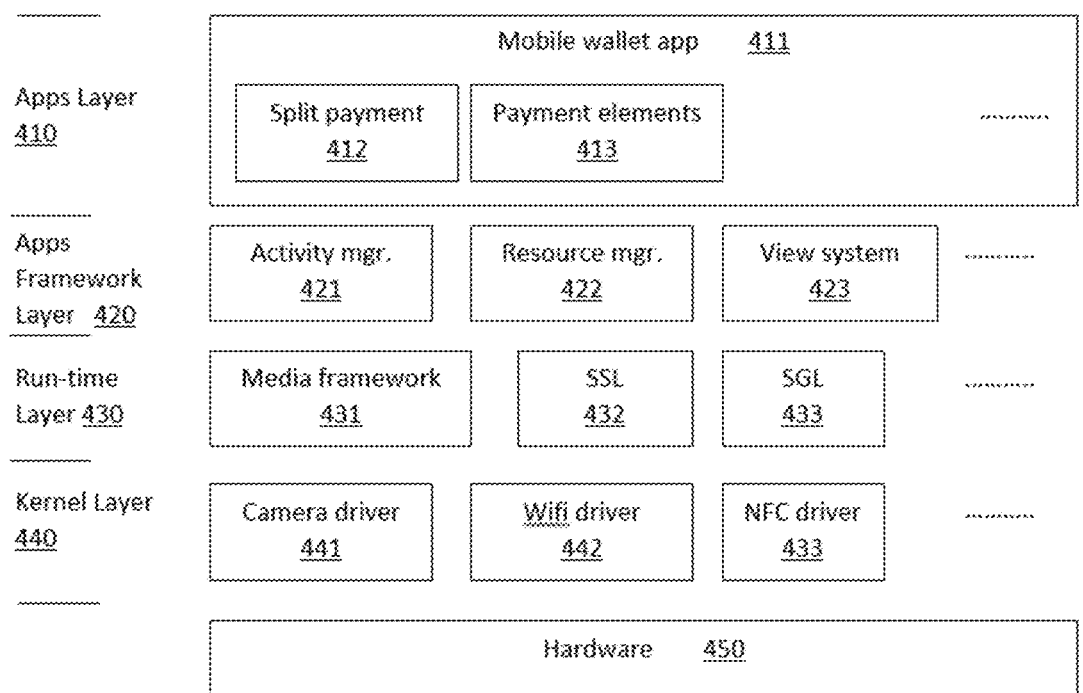
FIG. 4 is an illustration of an example mobile wallet application for making partial mobile payments from a plurality of payment accounts in accordance with one or more aspects of the disclosure.

Turning now to FIG. 4, illustrated is an example mobile wallet application system 400 for making partial mobile payments from a plurality of payment accounts in accordance with one or more aspects of the disclosure.

The mobile wallet application system can comprise a hardware layer 450, a kernel layer 440, a run-time layer 430, an application framework layer 420 and an application layer 410. The kernel layer 440 can provide a level of abstraction between the device hardware 450 and contain all the essential hardware drivers like camera driver 441, WiFi driver 442, near field communication driver 433, keypad, display etc. Also, the kernel layer 440 can handle memory management, security settings, power management, and shared libraries support.

On top of kernel 440 there can be a run-time layer 430 with a set of libraries including play and record audio and video (media framework) 431, scene graphic library (SGL) 433, and secure socket layer (SSL) libraries 432 responsible for Internet security etc.

The application framework layer 420 can provide higher-level services to applications in the form of Java classes. Application developers are allowed to make use of these services in their applications. The components in the apps framework layer 420 includes an activity manager 421 which controls all aspects of the application lifecycle and activity stack; a resource manager 422 which provides access to non-code embedded resources such as strings, color settings and user interface layouts; a view system which is an extensible set of views used to create application user interfaces; and others.

The application layer 410 can include a mobile wallet application 411. The mobile wallet application 411 can include a split payment manager 412, payment elements 413, and others. The split payment manager 412 can be the function which presents the user interface shown in FIG. 3 and processes the split payment method. The payment elements 413 comprises electronic version of items in wallets such as credit and debit card, bank account, and other financial accounts.

Figure 5:
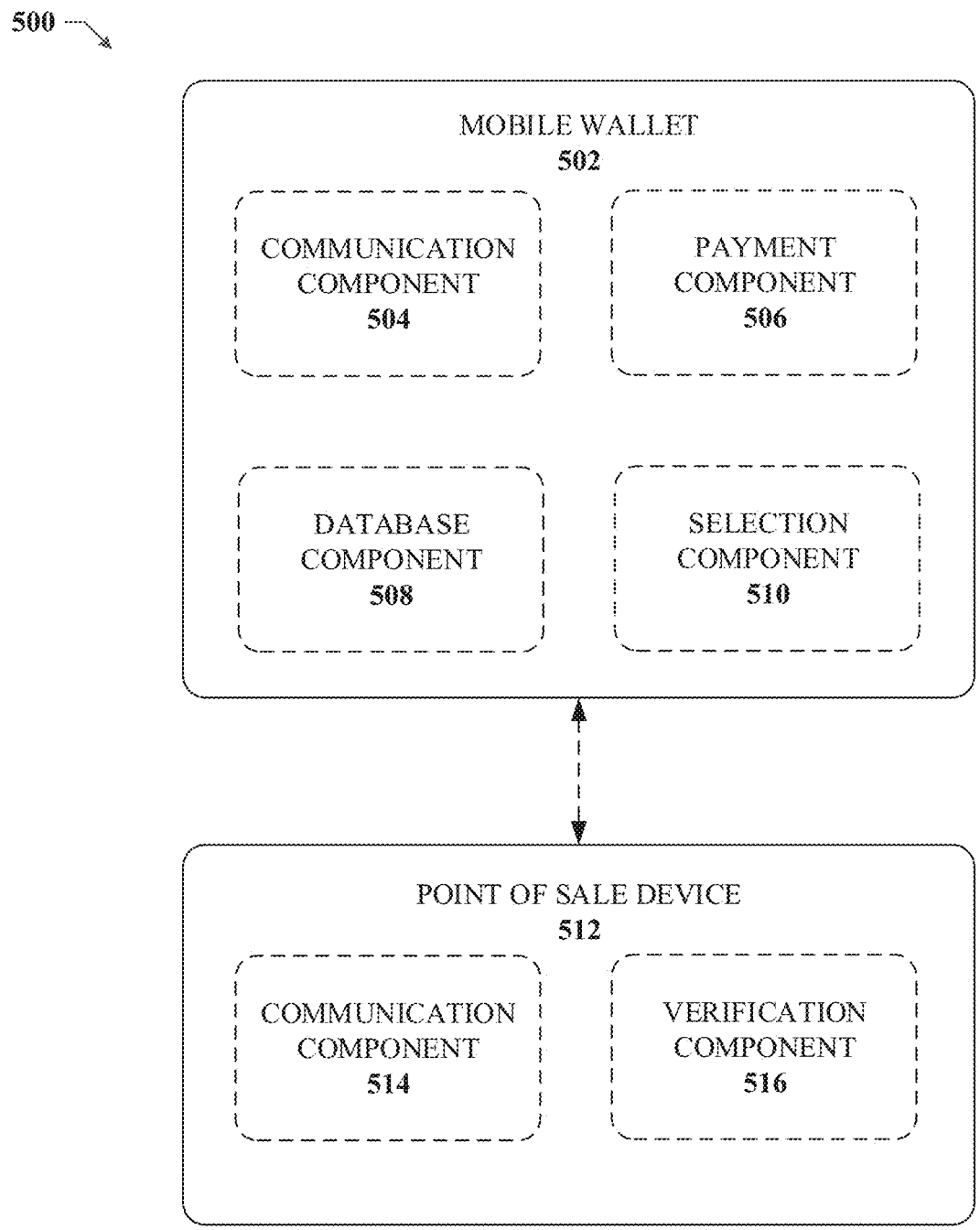
FIG. 5 is an illustration of an example split payment system with a mobile wallet and a point of sale device in accordance with one or more aspects of the disclosure.

Turning now to FIG. 5, illustrated is an example split payment system 500 with a mobile wallet 502 and a point of sale device 512 in accordance with one or more aspects of the disclosure.

A mobile wallet 502 can operate on a mobile computing device, which can include tablets, laptops, mobile phones, wearable devices, or any other computing device that is capable of executing a mobile wallet application.

The mobile wallet 502 can include a communication component 504 configured to receive a wireless transmission sent by a communications component 514 at a point of sale device 512. In an embodiment, the wireless transmission can include WiFi, Bluetooth, cellular protocols, infrared transmission, WiMax, Zigbee, RFID protocols, or any other near field communication protocols. In an embodiment, the point of sale device 512 can transmit an invoice to mobile wallet 502 via an optical communication, either via laser, pulsing lights or by providing a barcode or quick response (QR) code that can be scanned by the mobile device associated with mobile wallet 502.

The mobile wallet 502 can receive the invoice, and a selection component 510 can determine which payment accounts associated with the mobile wallet 502 will be used to pay the invoice. In some embodiments, the accounts can be selected automatically based on a predetermined selection logic. The predetermined selection logic can be used to select payment accounts that have the lowest balance or may return the highest rewards. For instance, certain credit cards may return rewards at particular vendors or classes of vendors, and the selection component 510 can select payment accounts to optimize the rewards received. In other embodiments, selection component 510 can select payment accounts based on preference rankings, or based on funds available in each of the payment accounts. In other embodiments, selection component 510 can receive input from a user, where the input includes information representing user selections.

Once the payment accounts have been selected by selection component 510 and the payment amounts for each payment account determined, payment component 506 can gather the payment information including account information, authentication information, and etc., from database component 508, and communication component 504 can wireless transmit the payment information to communication component 514 on point of sale device 512.

Verification component 516 can then send the payment information to a payment server associated with one or more of the payment accounts for processing. The verification component 516 can send the payment information for the different payment accounts either sequentially, or in parallel. In a sequential process, the point of sale device 512 would get payment authorization from a first financial institution and then if successful, would request a payment authorization for a second payment from a second financial institution and so on. In a parallel process, the point of sale device 512 would requests payment authorizations simultaneously to multiple financial institutions and then verify if all institutions authorized the payments.

In an embodiment, the payment component 506 can prepare payment information for just a single payment account and have the payment information transmitted to point of sale device 512. Verification component 516 can process the partial payment for the single payment account, and once the payment has been verified/authorized, can indicate to the mobile wallet 502 to prepare the subsequent partial payments. In other embodiments, communication component 504 can send the payment information for all the payment accounts together, and verification component 516 can sequentially or simultaneously send all the payment information for processing to one or more payment servers. After receiving notification from the payment servers that the payment information has been successfully processed, communication component 514 can send a receipt to communication component 504 on the mobile wallet 502.

Figure 6:
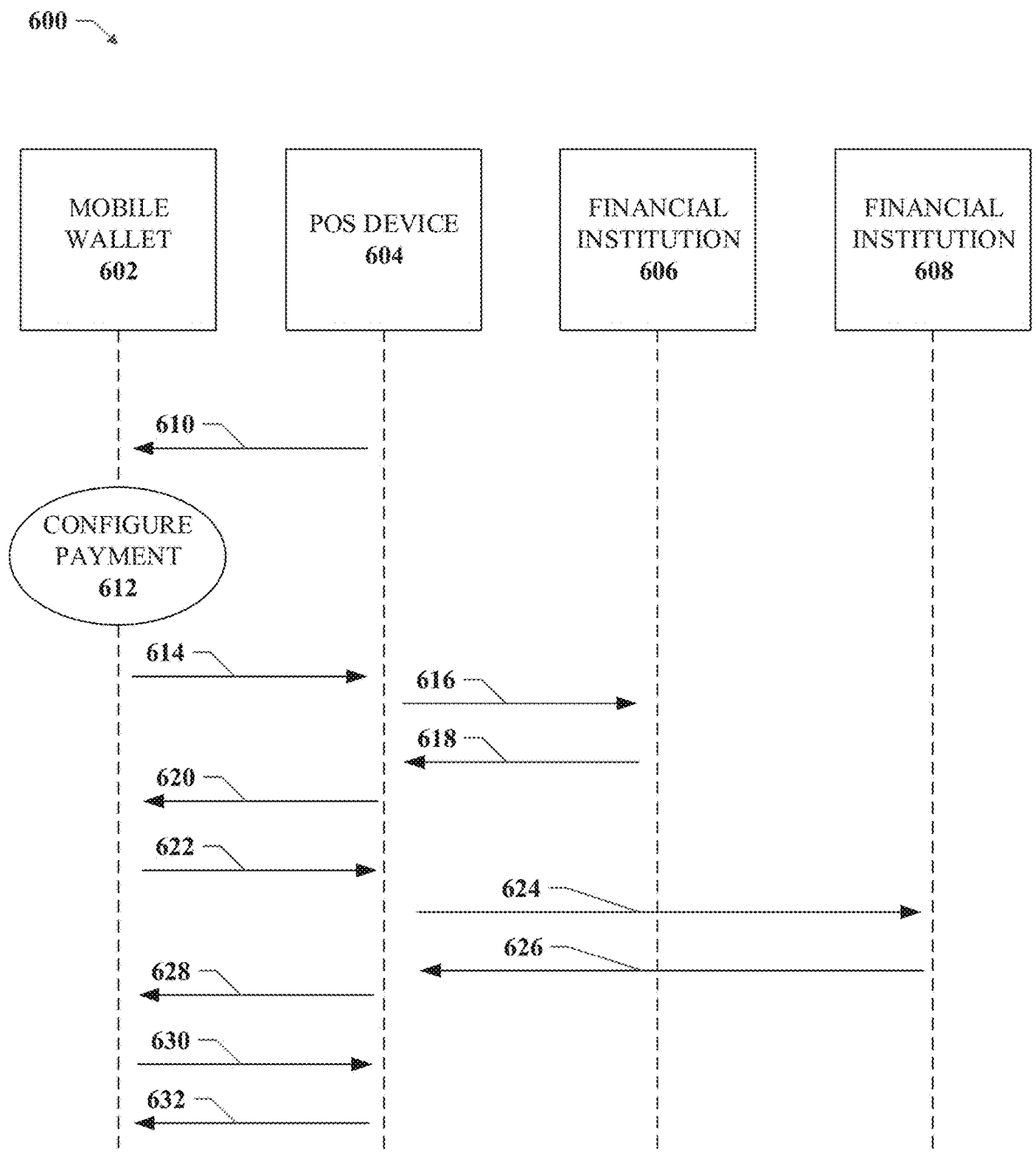
FIG. 6 is an illustration of an example flow chart of a method for making payments using multiple payment accounts, according to one or more embodiments.
Figure 7:
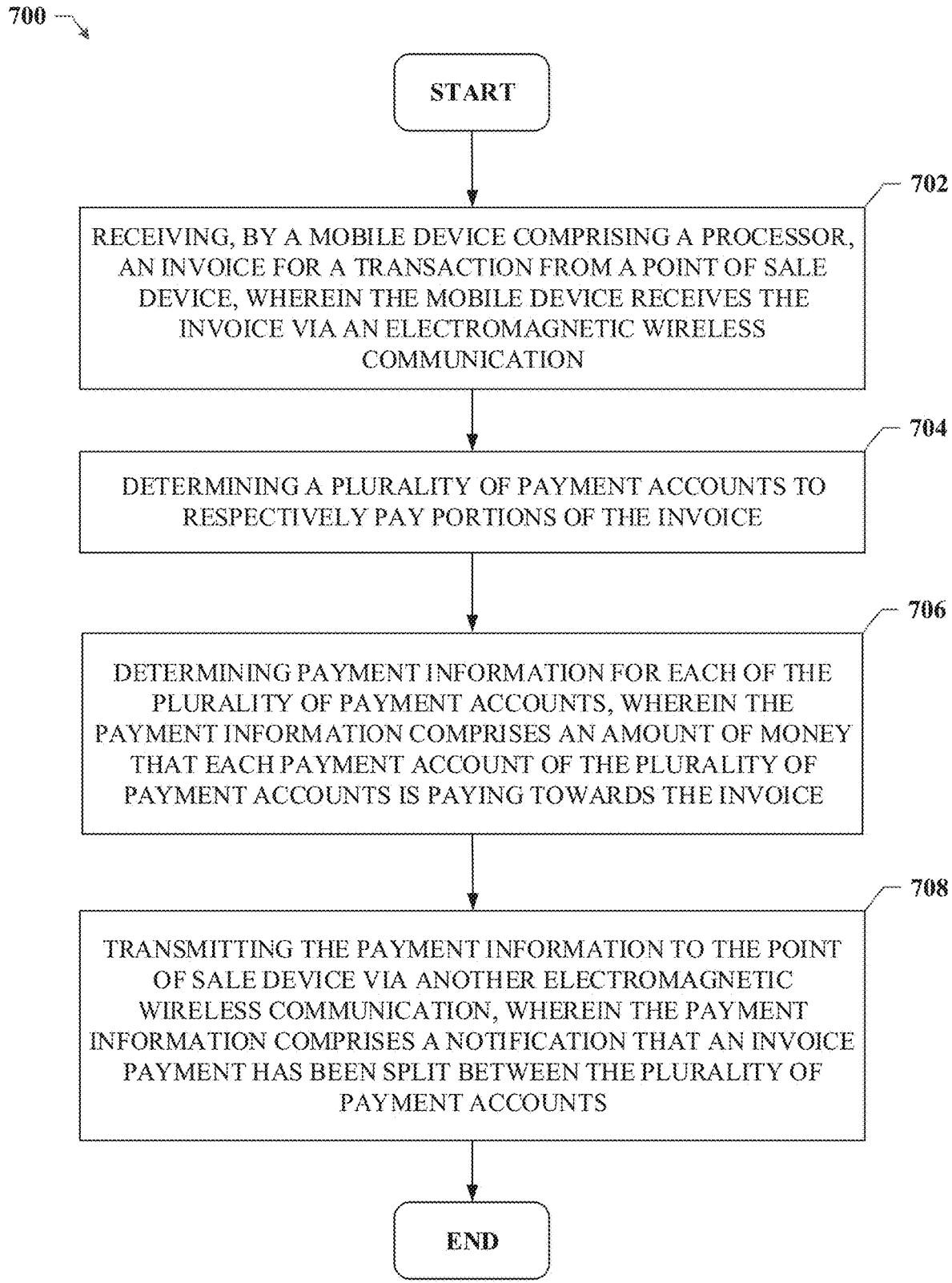
FIG. 7 is an illustration of an example flow chart of a method for making payments using multiple payment accounts, according to one or more embodiments.
Figure 8:
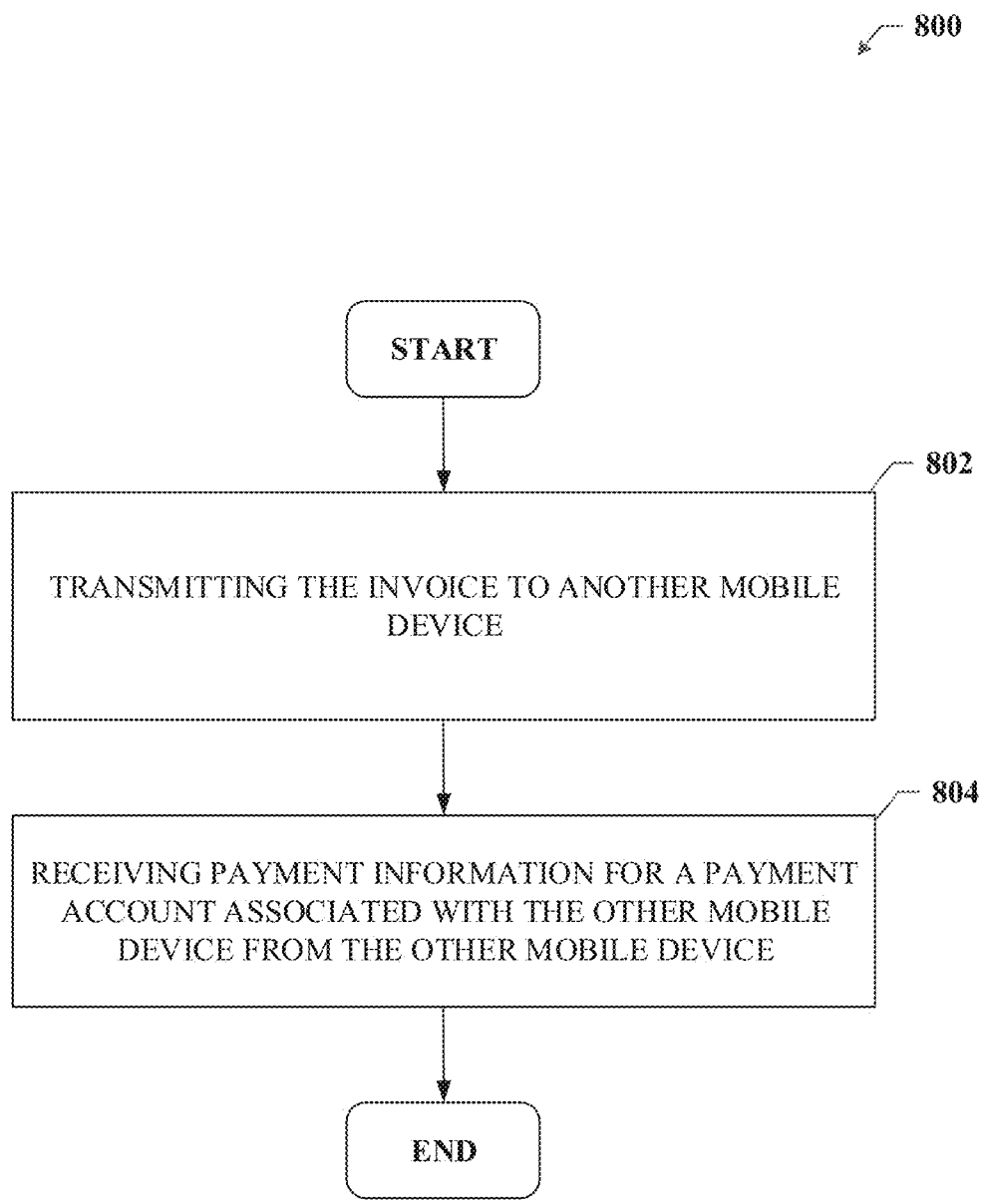
FIG. 8 is an illustration of an example flow chart of a method for making payments using multiple payment accounts, according to one or more embodiments.

FIGS. 6-8 illustrates processes in connection with the aforementioned systems. The process in FIGS. 6-8 can be implemented for example by systems and methods 100, 200, 300, 400, and 500, illustrated in FIGS. 1-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Turning now to FIG. 6, illustrated an example flow chart of a method for making payments using multiple payment accounts, according to one or more embodiments.

When a shopper purchases a product, she may ask if the point of sale device 604 is capable of processing split payments. In other embodiment, the point of sale device 604 may submit an invoice at 610 with total amount and indicating that it can process split payments in the communication protocol between the point of sale device 604 and the mobile wallet 602. In step 610, the point of sale device 604 submits an invoice with total amount to the mobile wallet 602 and indicates that it can process split payments. In other embodiments, the point of sale device 604 may not have the step 610 of submitting the invoice to the mobile device 602. The merchant may verbally communicate the total to the mobile wallet owner and the mobile wallet owner may configure a payment method with multiple accounts at 612 and submit them to the point of sale device 604. The mobile wallet user configures a payment method using a plurality of payment accounts at 612 and can submit the $1^{st}$ payment to the point of sale device 604 by placing the mobile device over the point of sale device 604 in 614. The point of sale device 604 can requests an authorization to the $1^{st}$ issuer or financial institution associated with the first payment account at 616. The $1^{st}$ issuer or financial institution 606 issues an authorization in at 618 and the point of sale device 604 lets the mobile wallet 602 know about the authorization at 620.

The mobile wallet 602 can submits a second payment 622 and the point of sale device 604 sends the payment information to the second issuer or financial institution at 624, gets an authorization of payment at 626 and transmits the authorization to the mobile wallet at 628. The mobile wallet 602 can submit the next account at 630 until the sum of split amount is equal to the total amount in the invoice. The mobile wallet may indicates end of payment at 630 as well and then the point of sale device 604 can send a receipt to the mobile wallet at 632.

In other embodiments, the mobile wallet 602 may not send end of payment and the point of sale device 604 sends a receipt to indicate completion of the transaction if the total amount in the invoice is equal to the sum of split payments. In an alternative embodiment, the mobile wallet may send multiple payment accounts, simultaneously instead of sending one at a time and the point of sale device 604 processes them one at a time.

It is to be appreciated that while in FIG. 6, one mobile wallet is used to submit split payments for a transaction, in other embodiments, multiple mobile wallets may submit split payments for a single transaction. For instance, three people may use their own mobile wallet and make three payments for a single bill.

Turning now to FIG. 7, illustrated is an example flow chart of a method 700 for receiving and broadcasting application updates, according to one or more embodiments. The method can start at 702, where the method includes receiving, by a mobile device comprising a processor, an invoice for a transaction from a point of sale device, wherein the mobile device receives the invoice via an electromagnetic wireless communication. At 704, the method includes determining a plurality of payment accounts to respectively pay portions of the invoice. At 706, the method includes determining payment information for each of the plurality of payment accounts, wherein the payment information comprises an amount of money that each payment account of the plurality of payment accounts is paying towards the invoice. At 708 the method includes transmitting the payment information to the point of sale device via another electromagnetic wireless communication, wherein the payment information comprises a notification that an invoice payment has been split between the plurality of payment accounts.

Turning now to FIG. 8, illustrated is a method 800 for receiving and broadcasting application updates, according to one or more embodiments. At 802 the method includes transmitting the invoice to another mobile device. At 804 the method includes receiving payment information for a payment account associated with the other mobile device from the other mobile device.

Figure 9:
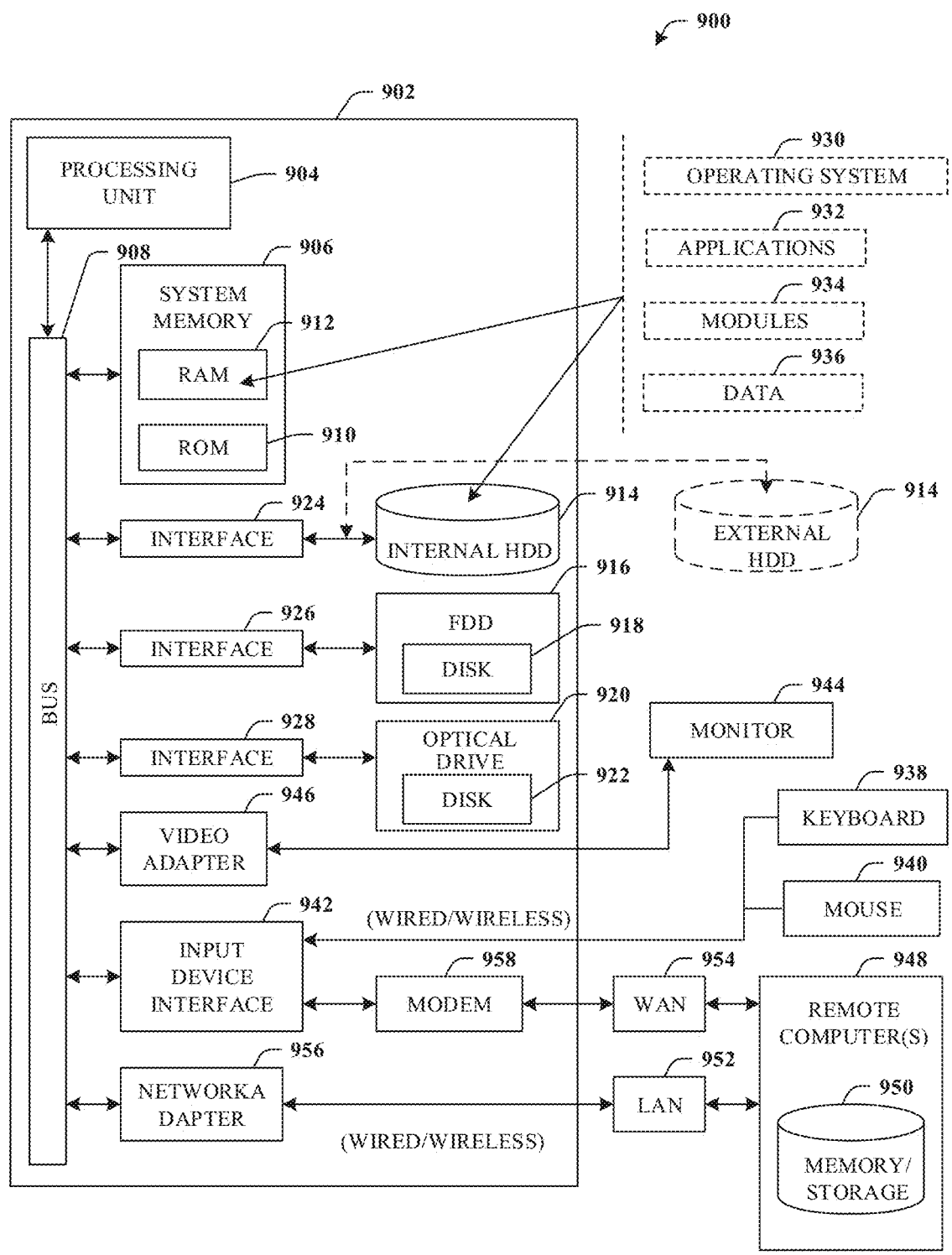
FIG. 9 is an illustration of an example computing environment where one or more of the provisions set forth herein are implemented, according to one or more embodiments.

Referring now to FIG. 9, there is illustrated a block diagram of a computer operable to execute the disclosed architecture. In order to provide additional context for various aspects of the subject innovation, FIG. 9 and the following discussion are intended to provide a brief, general description of a suitable computing environment 900 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects of the innovation includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 912, including an operating system 930, one or more application programs 932, other program modules 934 and program data 936. All or portions of the operating system, applications, modules, and/or data can also be cached in the RAM 912. The innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/ wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adapter 956 may facilitate wired or wireless communication to the LAN 952, which may also include a wireless access point disposed thereon for communicating with the wireless adapter 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules or components depicted relative to the computer 902, or portions thereof, can be stored in the remote memory/storage device 950. The network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 10:
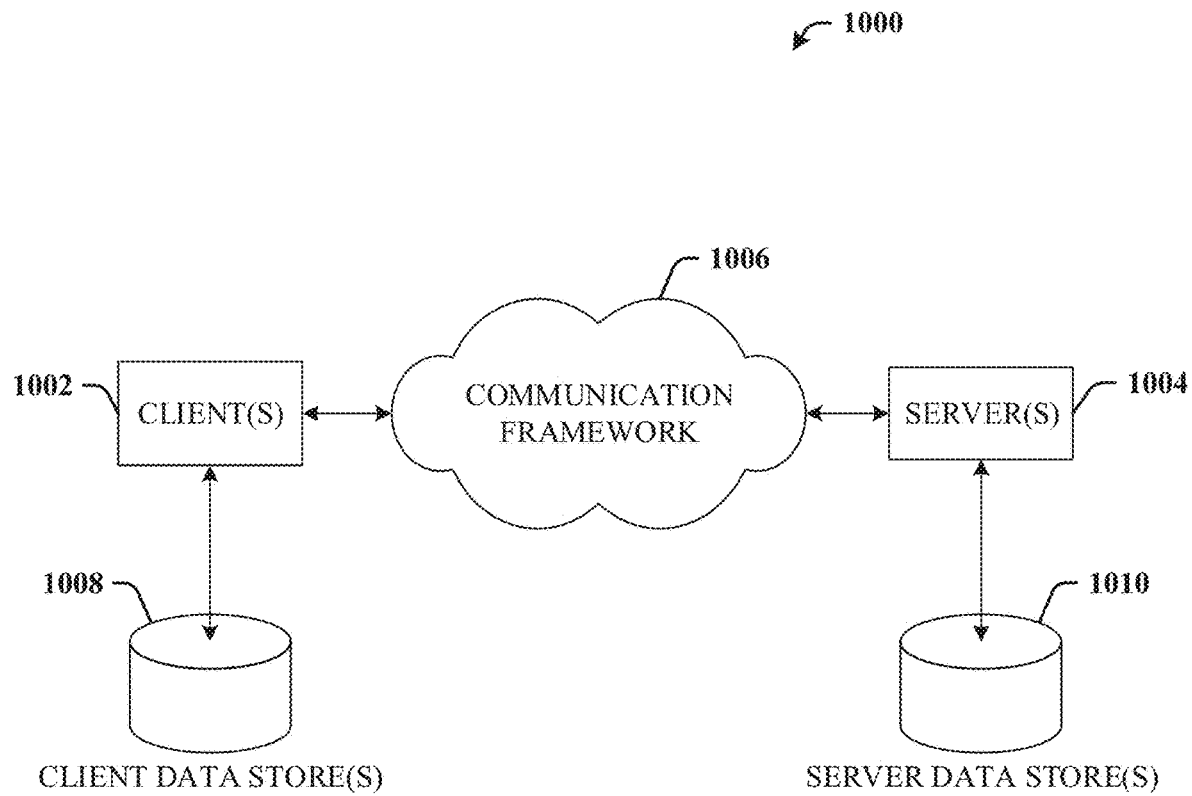
FIG. 10 is an illustration of an example computing environment where one or more of the provisions set forth herein are implemented, according to one or more embodiments.

Referring now to FIG. 10, there is illustrated a schematic block diagram of an exemplary computing environment 1000 in accordance with the subject innovation. The system 1000 includes one or more client(s) 1002. The client(s) 1002 can be hardware and/or software (e.g., threads, processes, computing devices).

The system 1000 also includes one or more server(s) 1004. The server(s) 1004 can also be hardware and/or software (e.g., threads, processes, computing devices). The servers 1004 can house threads to perform transformations by employing the innovation, for example. One possible communication between a client 1002 and a server 1004 can be in the form of a data packet adapted to be transmitted between two or more computer processes. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002. Similarly, the server(s) 1004 are operatively connected to one or more server data store(s) 1010 that can be employed to store information local to the servers 1004.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A mobile wallet system, comprising:
  a memory to store computer-executable instructions; and
  a processor, coupled to the memory, to facilitate execution of the computer-executable instructions to perform operations, comprising:
    receiving an invoice for a payment amount for a transaction initiated by a user via an electromagnetic wireless communication from a point of sale device;
    pre-selecting a plurality of payment accounts from a set of payment accounts associated with a mobile wallet to pay the invoice based on predetermined, user-defined preference information associated with the mobile wallet, wherein a first payment account is designated to pay a portion of the payment amount up to a predetermined amount and then, even if the balance of the first payment account is greater than the entire payment amount the remaining payment accounts of the pre-selected plurality of payment accounts are employed to pay a predesignated portion of the payment amount based on the user-defined preference information, wherein each of the plurality of payment accounts is associated with the user;
    generating payment information representing the pre-selected plurality of payment accounts and predesignated payment amounts for each payment account;
    generating a notification that the payment information includes a split payment; and
    transmitting the payment information and the notification to the point of sale device via another electromagnetic wireless communication for processing,
    wherein the operations further comprise, at user discretion, splitting payments between multiple users as follows:
      transmitting the invoice to at least one additional mobile device associated with at least one additional mobile wallet system, receiving payment information from the at least one additional mobile device, each additional mobile device being associated with a respective additional user.

2. The mobile wallet system of claim 1, wherein the electromagnetic wireless communication conforms to at least one of a near field communication protocol, wireless internet protocol, wireless communication protocol, cellular protocol, or optical communication protocol.

3. The mobile wallet system of claim 1, wherein the notification that the payment information includes a split payment is included in the metadata of the transmission, and wherein the payment information comprises payment account information, authentication information, and payment amount information for each payment account of the plurality of payment accounts.

4. The mobile wallet system of claim 1, wherein the transmitting further comprises:
transmitting payment information for a first payment account; and
in response to receiving a confirmation of payment from the point of sale device, transmitting payment information for a second payment account.

5. The mobile wallet system of claim 1, wherein the transmitting further comprises:
transmitting payment information for a first payment account and a second payment account to the point of sale device simultaneously.

6. The mobile wallet system of claim 1, wherein the payment accounts of the plurality of payment accounts are associated with respective mobile wallets associated with respective user accounts.

7. The mobile wallet system of claim 1, wherein the preference information is based on a function of predetermined preferences associated with a user account and financial rewards associated with each payment account of the set of payment accounts.

8. The mobile wallet system of claim 1, wherein the selecting the plurality of payment accounts further comprises:
selecting the plurality of payment accounts from a set of payment accounts associated with the mobile wallet based on balance information associated with each of the set of payment accounts.

9. A method, comprising:
receiving, by a mobile device associated with a user comprising a processor, an invoice for a payment amount for a transaction from a point of sale device, wherein the mobile device receives the invoice via an electromagnetic wireless communication;
pre-selecting a plurality of payment accounts from a set of payment accounts associated with a mobile wallet to pay the invoice based on predetermined, user-defined preference information associated with the mobile wallet, wherein each payment account of the plurality of payment accounts is employed to pay a predesignated portion of the payment amount based on the user-defined preference information, wherein each of the plurality of payment accounts is associated with the user;
generating payment information representing the pre-selected plurality of payment accounts and predesignated payment amounts for each payment account; and
transmitting the payment information to the point of sale device via another electromagnetic wireless communication for processing, wherein the payment information comprises a notification that an invoice payment has been split between the plurality of payment accounts;
wherein the operations further comprise, at user discretion, splitting payments between multiple users as follows:
transmitting the invoice to at least one additional mobile device associated with at least one additional mobile wallet system,
receiving payment information from the at least one additional mobile device, each additional mobile device being associated with a respective additional user, and
splitting invoice payment automatically according to a predetermined ratio.

10. The method of claim 9, wherein the electromagnetic wireless communication conforms to at least one of a near field communication protocol, wireless internet protocol, wireless communication protocol, cellular protocol, or optical communication protocol.

11. The method of claim 9, wherein the payment information further comprises payment account information, and authentication information for each payment account of the plurality of payment accounts.

12. The method of claim 9, further comprising:
transmitting payment information for a first payment account; and
in response to receiving a confirmation of payment from the point of sale device, transmitting payment information for a second payment account.

13. The method of claim 9, wherein the preference information is based on a function of predetermined preferences associated with a user account and financial rewards associated with each payment account of the set of payment accounts.

* * * * *